Dec. 13, 1932.  W. B. SMITH  1,891,209
BAIL EAR AND METHOD THEREFOR
Filed July 30, 1932
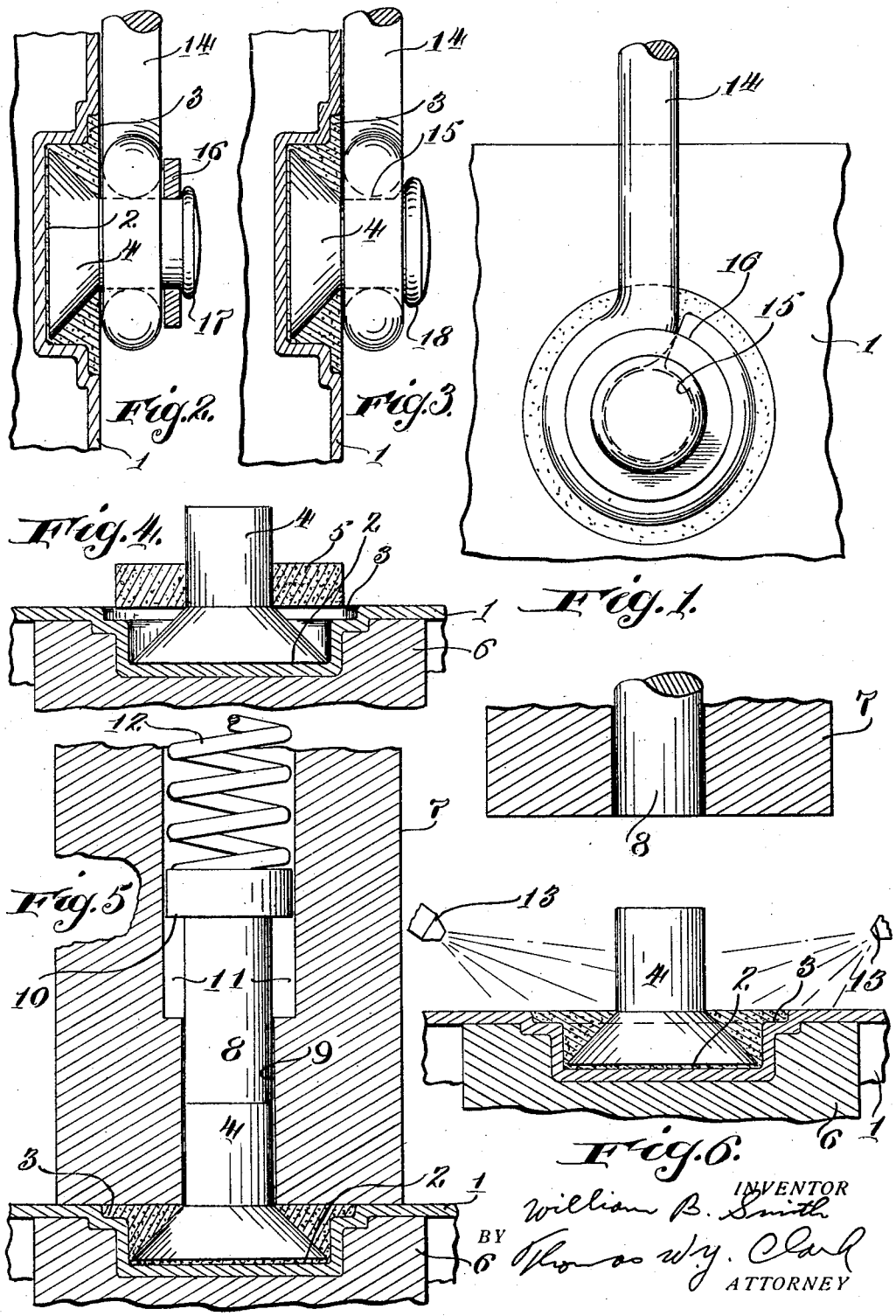

Patented Dec. 13, 1932

1,891,209

UNITED STATES PATENT OFFICE

WILLIAM B. SMITH, OF BALTIMORE, MARYLAND, ASSIGNOR OF ONE-HALF TO CARL T WEBER, OF BALTIMORE, MARYLAND

BAIL EAR AND METHOD THEREFOR

Application filed July 30, 1932. Serial No. 626,331.

My invention relates to a bail ear for a sheet metal container and the process of applying the same, and its objects are to make a very inexpensive ear which will hold a heavy load and which will not require the usual perforation of the container wall.

I attain these and other objects and advantages in the manner illustrated in the accompanying drawing which is enlarged and in which:

Figure 1 is a fragmentary side elevation of a container embodying my invention.

Fig. 2 is a partial sectional view thereof.

Fig. 3 is a partial sectional view of a modified form thereof.

Fig. 4 is a partial sectional view of the first operation of applying the stud to the container wall.

Fig. 5 shows the soldering operation.

Fig. 6 shows the solder setting operation.

Similar numerals refer to similar parts throughout the several views.

The sheet metal container body 1 has an imperforate seat 2 on each side of the container formed with inwardly stepped walls, the first step 3 being relatively shallow, and the final step or seat bottom being considerably deeper. A flat and outwardly tapered headed pivot stud 4 has its head placed against this seat 2. A ring of solder 5 is then placed around the body of the stud, and the container placed in a soldering machine, having an inside centering member 6 fitting inside the container over the outside of the inwardly projecting seat.

The heated soldering iron 7 is then lowered upon the solder ring 5, melting it down into the channel formed by the tapered stud head and the walls of the seat, some of it flowing back of the stud head. The stepped walls furnish a greater surface for the adhesion of the solder, and the stud head fits snugly into the smaller opening, giving a solid support for the upper edge of the stud. The inset of the seat also furnishes a receptacle for both solder and stud head, so that the body only of the stud projects from the outer wall of the container. The use of a ring of solder insures use of exactly the right amount to fill the seat inset without any waste, making a uniform consumption of solder for each stud, thereby saving solder. A pin 8 works in opening 9 in the iron 7, the pin having an enlarged head 10 working in enlarged opening 11 in the iron, the head limiting the outward extension of pin 8. A spring 12 pushes the pin 8 outwardly as the iron is withdrawn, the pin holds the stud in place while air from nozzles 13 set or cool the solder, so that by the time the iron and pin are both withdrawn, the stud is securely held by the solder.

The bail 14 has an eye 15 at its end, which eye is placed over the body of the pivot stud, and in the preferred form, a washer 16, is then placed over the stud, and the head of the stud is burred over as at 17 to enlarge it and prevent the removal of the washer. The washer may be omitted, as in Fig. 3, in which event the burring should make a little larger head on the stud, as at 18. The burring machine may have an inside centering member like member 6 on the soldering machine.

This structure permits the bail to be substantially in line with the container body, and the tendency to pull the stud from the container body is comparatively slight, it is so nearly a direct lift from the container side. I have held a very large weight on a very small stud.

The studs and their heads being so small, and the seats in the container body being also small, those seats may be much nearer the top of the container than usual, thus saving in length of bail wire, and interfering less with the container label.

It is apparent to those skilled in the art that many changes may be made in the structure of my new bail ear and the process of applying the same, and therefore I do not intend to be limited to the details shown and described, but only by the appended claims.

What I claim as new and desire to secure by Letters Patent is:

1. A bail attaching means comprising a sheet metal wall having an inwardly pressed imperforate seat, a flat headed pivot stud having its head in said seat, the head and seat wall forming a channel, and solder in said channel, the outer extent of said head and solder being substantially flush with the outer sheet metal wall, said stud forming a pivot for an eye of a bail.

2. A bail attaching means comprising a sheet metal wall having an inwardly pressed imperforate seat, a flat headed pivot stud having its head in said seat, the head and seat wall forming a channel and solder in said channel, the outward extent of said head and solder being substantially flush with the outer sheet metal wall, and a bail having an eye adjacent the end thereof surrounding said pivot, and means to prevent the removal of the bail eye.

3. A bail attaching means comprising a sheet metal wall having an inwardly pressed imperforate seat, a flat headed pivot stud having its head in said seat, the head and seat wall forming a channel and solder in said channel, the outward extent of said head and solder being substantially flush with the outer sheet metal wall, and a bail having an eye adjacent the end thereof surrounding said pivot, said pivot being expanded at its outer end to prevent the removal of the bail eye thereover.

4. A bail attaching means comprising a sheet metal wall having an inwardly pressed imperforate seat, a flat headed pivot stud having its head in said seat, the head and seat wall forming a channel and solder in said channel, the outward extent of said head and solder being substantially flush with the outer sheet metal wall, and a bail having an eye adjacent the end thereof surrounding said pivot, said pivot being expanded at its outer end, and a washer interposed between the expanded portion and the bail eye to prevent the removal of the bail eye thereover.

5. A bail attaching means consisting of a sheet metal container having a flat imperforate seat formed therein by indenting the body of the container from the exterior inwardly below the upper edge of the container body, a pivot stud having an outwardly tapered head thereon, the top of said stud fitting snugly within said seat, and securing means for said stud head introduced around said tapered stud head wholly within the walls of said seat, and a bail having an eye at its extremity surrounding said pivot stud.

6. A bail attaching means consisting of a sheet metal container having an imperforate inwardly stepped walled seat formed therein by indenting the body of the container inwardly below the upper edge of the container body, a pivot stud having an outwardly tapered head thereon, the top of the head fitting snugly within the stepped wall of least periphery of said seat, the tapered head of the stud and seat walls forming a channel, and means wholly within said channel to secure the stud head therein and a bail having an eye at its extremity surrounding said pivot stud.

7. A bail attaching means consisting of a sheet metal container having an imperforate inwardly stepped walled seat formed therein by indenting the body of the container inwardly below the upper edge of the container body, a pivot stud having an outwardly tapered head thereon, the top of the head fitting snugly within the stepped wall of least periphery of said seat, the tapered head of the stud and seat walls forming a channel, and means wholly within said channel to secure the stud head therein and a bail having an eye at its extremity surrounding said pivot stud, and means to prevent the removal of the bail eye.

8. The process of forming a bail attaching means comprising, indenting the wall of the container to form a seat, placing in said seat the head of a flat headed pivot stud, encircling said pivot stud with a ring of solder, soldering said pivot stud in said seat with said solder, and cooling the soldered juncture.

9. The method of applying to the body of a sheet metal container a flat headed pivot stud for a bail support, which consists in pressing said container body to form therein an inwardly directed indentation, seating within said indentation the head of a pivot stud, flowing solder in the channel between said head and the walls of said indentation, whereby a bail eye, placed on said pivot stud may be in substantial alignment with the container wall.

10. The process of forming a bail attaching means comprising indenting the wall of a container to form an inwardly stepped walled seat, placing within the stepped wall of least periphery of said seat the top of a flat and outwardly tapering headed pivot stud, placing a securing means wholly within the channel formed by said seat walls and tapered stud head to hold the pivot stud in place and pivotally securing around said pivot stud the end of a bail.

WILLIAM B. SMITH.